United States Patent
Saitoh et al.

(10) Patent No.: US 10,104,359 B2
(45) Date of Patent: Oct. 16, 2018

(54) DISPARITY VALUE DERIVING DEVICE, MOVABLE APPARATUS, ROBOT, DISPARITY VALUE PRODUCING METHOD, AND COMPUTER PROGRAM

(71) Applicants: Kiichiroh Saitoh, Kanagawa (JP); Yoshikazu Watanabe, Tokyo (JP); Soichiro Yokota, Kanagawa (JP); Ryohsuke Tamura, Kanagawa (JP); Wei Zhong, Kanagawa (JP)

(72) Inventors: Kiichiroh Saitoh, Kanagawa (JP); Yoshikazu Watanabe, Tokyo (JP); Soichiro Yokota, Kanagawa (JP); Ryohsuke Tamura, Kanagawa (JP); Wei Zhong, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/100,895

(22) PCT Filed: Dec. 12, 2014

(86) PCT No.: PCT/JP2014/083626
§ 371 (c)(1),
(2) Date: Jun. 1, 2016

(87) PCT Pub. No.: WO2015/088044
PCT Pub. Date: Jun. 18, 2015

(65) Prior Publication Data
US 2016/0301912 A1    Oct. 13, 2016

(30) Foreign Application Priority Data

Dec. 12, 2013  (JP) .................................. 2013-257217
Dec. 26, 2013  (JP) .................................. 2013-268468
Nov. 19, 2014  (JP) .................................. 2014-234777

(51) Int. Cl.
*H04N 13/128*    (2018.01)
*G06K 9/00*    (2006.01)
(Continued)

(52) U.S. Cl.
CPC ....... *H04N 13/128* (2018.05); *G06K 9/00805* (2013.01); *G06K 9/46* (2013.01);
(Continued)

(58) Field of Classification Search
CPC ......... G06K 9/46; G06T 7/0044; G06T 11/60; H04N 13/0022
(Continued)

(56) References Cited

U.S. PATENT DOCUMENTS 5,602,653 A    2/1997  Curry
6,215,898 B1   4/2001  Woodfill et al.
(Continued)

FOREIGN PATENT DOCUMENTS

CN    103198314 A    7/2013
CN    103247033 A    8/2013
(Continued)

OTHER PUBLICATIONS

Heiko Hirschmuller, "Accurate and Efficient Stereo Processing by Semi-Global Matching and Mutual Information", Institute of Robotics and Mechatronics Oberpfaffenhofen German Aerospace Center (DLR) issued on Jun. 20-26, 2005.
(Continued)

*Primary Examiner* — Ruiping Li
(74) *Attorney, Agent, or Firm* — Oblon, McClelland, Maier & Neustadt, L.L.P.

(57) ABSTRACT

A disparity value deriving device includes a calculator configured to calculate costs of candidates for a corresponding region in a comparison image that corresponds to a reference region in a reference image, based on luminance
(Continued)

values of the regions. The device also includes a changer configured to change a cost exceeding a threshold to a value higher than the threshold; a synthesizer configured to synthesize a cost of a candidate for a corresponding region for one reference region after the change and a cost of a candidate for a corresponding region for another reference region after the change; and a deriving unit configured to derive a disparity value based on a position of the one reference region and a position of the corresponding region in the comparison image for which the cost after the synthesis is smallest.

17 Claims, 18 Drawing Sheets

(51) Int. Cl.
*G06K 9/46* (2006.01)
*G06T 11/60* (2006.01)
*G06T 7/73* (2017.01)
*G06T 7/593* (2017.01)
*H04N 13/00* (2018.01)

(52) U.S. Cl.
CPC ............... *G06T 7/593* (2017.01); *G06T 7/74* (2017.01); *G06T 11/60* (2013.01); *G06K 2009/4666* (2013.01); *G06T 2207/20221* (2013.01); *G06T 2207/30261* (2013.01); *H04N 2013/0081* (2013.01)

(58) Field of Classification Search
USPC ......................................................... 382/195
See application file for complete search history.

(56) References Cited

U.S. PATENT DOCUMENTS

| | | | |
|---|---|---|---|
| 6,456,737 | B1 | 9/2002 | Woodfill et al. |
| 2006/0013473 | A1 | 1/2006 | Woodfill et al. |
| 2006/0029272 | A1 | 2/2006 | Ogawa |
| 2009/0136091 | A1 | 5/2009 | Woodfill et al. |
| 2010/0091017 | A1 | 4/2010 | Kmiecik et al. |
| 2011/0210851 | A1 | 9/2011 | Woodfill et al. |
| 2012/0014590 | A1* | 1/2012 | Martinez-Bauza .......... H04N 13/0271 382/154 |
| 2012/0155747 | A1 | 6/2012 | Hwang |
| 2012/0194652 | A1 | 8/2012 | Myokan et al. |
| 2012/0263386 | A1 | 10/2012 | Schlosser et al. |
| 2013/0101160 | A1 | 4/2013 | Woodfill et al. |
| 2015/0243043 | A1 | 8/2015 | Guan |
| 2015/0302596 | A1 | 10/2015 | Mizukami et al. |

FOREIGN PATENT DOCUMENTS

| | | |
|---|---|---|
| EP | 2 511 875 A1 | 10/2012 |
| JP | 2006-090896 A | 4/2006 |
| JP | 2011-128756 A | 6/2011 |
| JP | 2011-163900 A | 8/2011 |
| JP | 2012-177676 A | 9/2012 |
| JP | 2012-181142 A | 9/2012 |
| JP | 2014-115978 A | 6/2014 |
| JP | 2014-222429 A | 11/2014 |
| JP | 2015-143677 A | 8/2015 |
| WO | 2014/073670 A1 | 5/2014 |

OTHER PUBLICATIONS

Federico Tombari, etc., "Near real-time stereo based on effective cost aggregation", Pattern Recognition, 2008., ICPR2008. 19th international Conference on, Dec. 8, 2008, p. 1-4.
International Search Report dated Mar. 31, 2015 in PCT/JP2014/083626 filed on Dec. 12, 2014.
Extended Search Report dated Nov. 23, 2016 in European Patent Application No. 14869791.5
Office Action dated Mar. 20, 2018 in corresponding Chinese Patent Application No. 201480067342.3, with English Translation (12 pages), citing Refs. AA-AB, and AO-AP.

* cited by examiner (a)          (b)

FIG.7
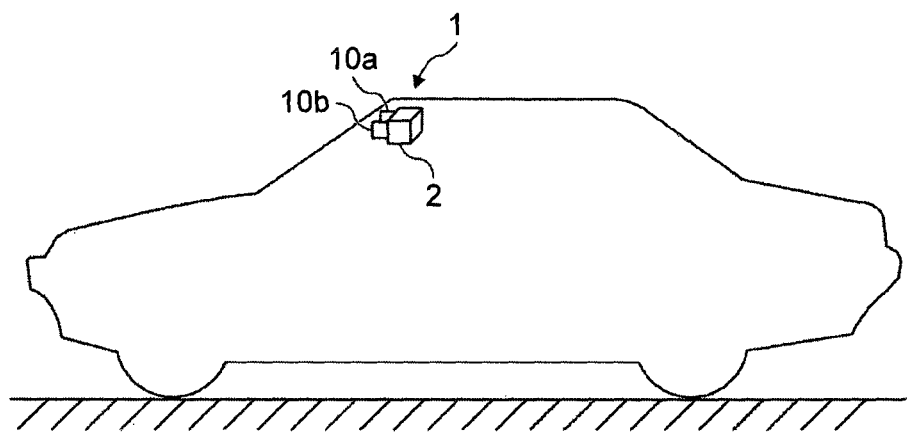
(a)
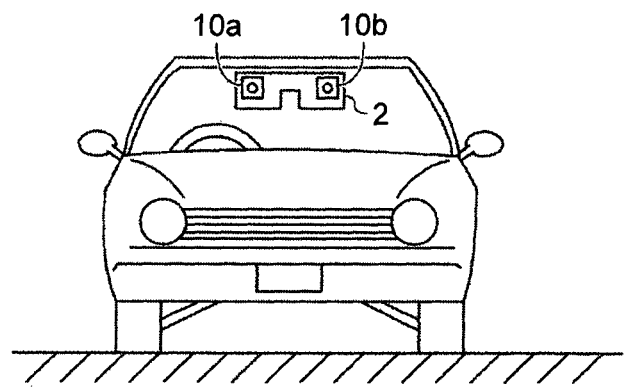
(b)

FIG.12
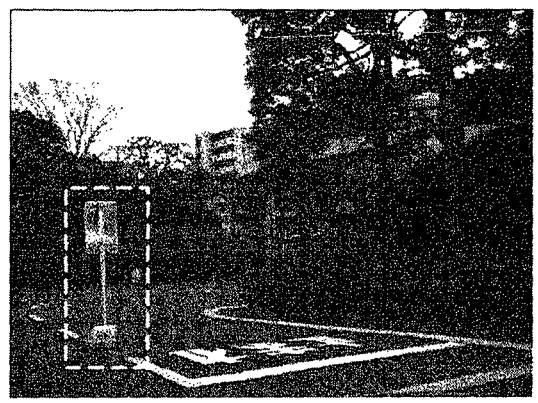
(a)
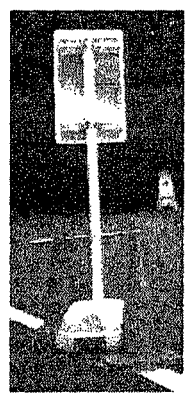 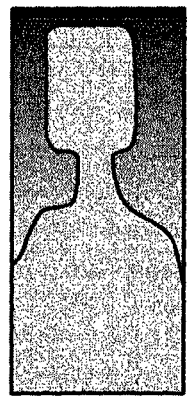 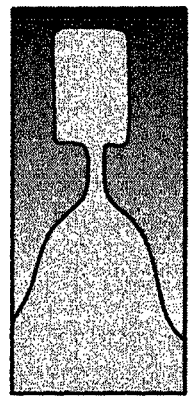 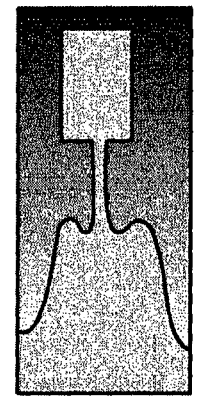
(b)　　　　　(c)　　　　　(d)　　　　　(e)

FIG.16
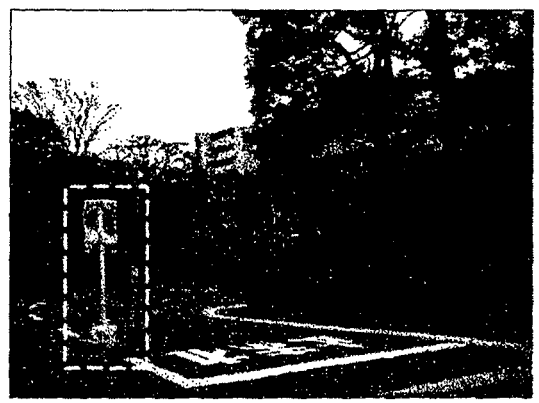
(a)
 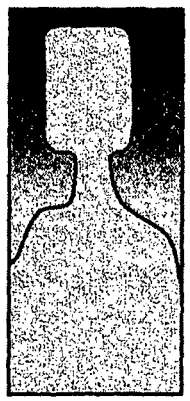 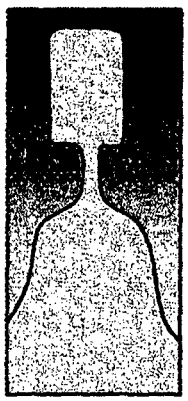 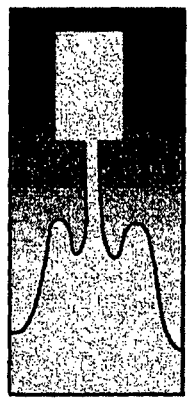
(b)　　　　(c)　　　　(d)　　　　(e)

DISPARITY VALUE DERIVING DEVICE, MOVABLE APPARATUS, ROBOT, DISPARITY VALUE PRODUCING METHOD, AND COMPUTER PROGRAM

TECHNICAL FIELD

The present invention relates to a disparity value deriving device, a movable apparatus, a robot, a disparity value producing method, and a computer program.

BACKGROUND ART

A distant measurement method is conventionally known, in which disparity for an object is derived from a stereo camera by stereo imaging and a disparity value indicating this disparity is used to measure the distance from the stereo camera to the object based on the principle of triangulation. With this distance measurement method, for example, the distance between automobiles or the distance between an automobile and an obstacle is measured to be utilized for preventing automobile collisions.

A stereo matching process is used for obtaining a disparity value. In this stereo matching process, a disparity value between a reference image obtained by one of two cameras of a stereo camera and a comparison image obtained by the other camera is calculated by obtaining the position of a corresponding pixel where image signals are most similar, while successively shifting a plurality of candidates for the corresponding pixel in the comparison image relative to a reference pixel of interest in the reference image. In general, the luminance values of the image signals obtained by two cameras are compared whereby the position of the pixel with the lowest one of costs (here, cost is "dissimilarity") in terms of luminance value compared among shift amounts is obtained (see Japanese Patent Application Laid-open No. 2006-090896).

However, in a region where texture indicating the magnitude of a luminance change of an object is weak and in which features to be extracted are scarce, a sufficient effect cannot be obtained even by performing edge detection.

A method of deriving more accurate disparity even for an object with weak texture is proposed (see, for example, Japanese Patent Application Laid-open No. 2012-181142). With this method, not only the cost of a reference pixel of interest in a reference image but also the costs of other pixels existing near to far positions from the reference pixel are aggregated to derive disparity for an object with weak texture.

However, when the distance between automobiles or other distance is measured using the method described in Japanese Patent Application Laid-open No. 2012-181142, costs for a road or other objects with weak texture are affected by costs for the surroundings with strong texture such as the vehicle running ahead. This causes failure to derive accurate costs.

SUMMARY OF THE INVENTION

It is an object of the present invention to at least partially solve the problems in the conventional technology.

According to an embodiment, there is provided a disparity value deriving device for deriving a disparity value indicating the disparity of an object from a reference image obtained by a first imaging unit capturing of an image of the object and a comparison image obtained by a second imaging unit capturing another image of the object. The disparity value deriving device includes a calculator configured to calculate costs of candidates for a corresponding region in the comparison image that corresponds to a reference region in the reference image, based on a luminance value of the reference region and luminance values of the candidates for the corresponding region, the candidates for the corresponding region being specified in a way that the respective candidates for the corresponding region are shifted on an epipolar line based on the reference region in the comparison image by individual shift amounts; a changer configured to change a cost exceeding a threshold among the costs calculated by the calculator to a given value higher than the threshold; a synthesizer configured to synthesize, with respect to each of the shift amounts, a cost of a candidate for a corresponding region that corresponds to one reference region after change by the changer and a cost of a candidate for a corresponding region that corresponds to another reference region after change by the changer; and a deriving unit configured to derive the disparity value based on a position of the one reference region in the reference image and a position of the corresponding region in the comparison image for which the cost after synthesis by the synthesizer is smallest.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 7 illustrates an automobile equipped with a disparity value deriving device according to an embodiment of the present invention.

FIG. 12 illustrates examples of a reference image, a part of the reference image, a high density disparity image without cost change, a high density disparity image with cost change with a threshold Th=40, and a high density disparity image with cost change with a threshold Th=20.

FIG. 16 illustrates examples of a reference image, a part of the reference image, a high density disparity image without cost change, and high density disparity images with cost change.

DESCRIPTION OF EMBODIMENTS

Embodiments of the present invention will be described below with reference to the accompanying drawings.

Overview of Distance Measurement Method Using SGM Method

Referring first to FIG. 1 to FIG. 6, an overview of a distance measurement method using the semi-global matching (SGM) method will be described. The SGM method is disclosed in Accurate and Efficient Stereo Processing by Semi-Global Matching and Mutual Information) and a brief explanation is given below.

Principle of Distance Measurement

Figure 1:
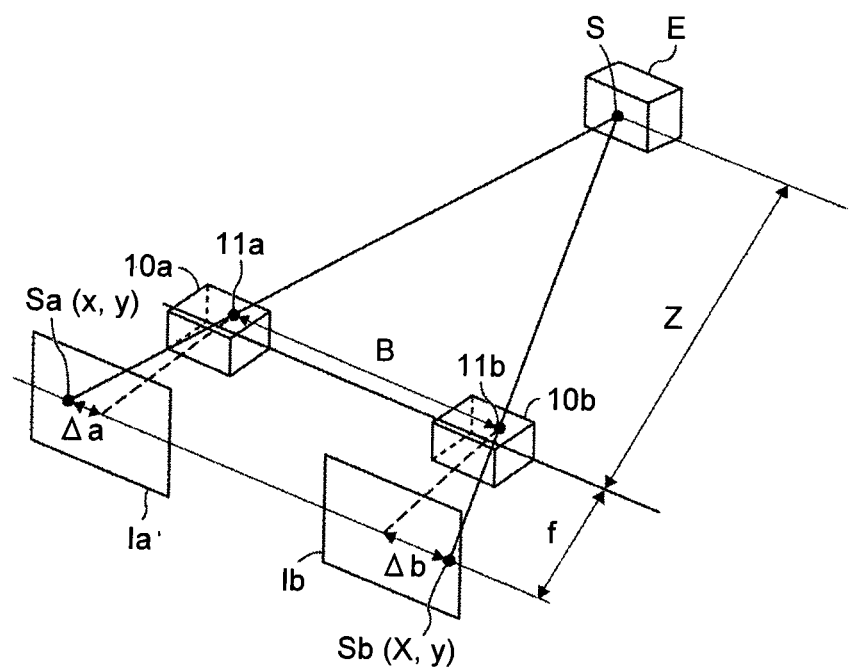
FIG. 1 is an illustration of the principle of deriving the distance from an imaging device to an object.
Figure 2:
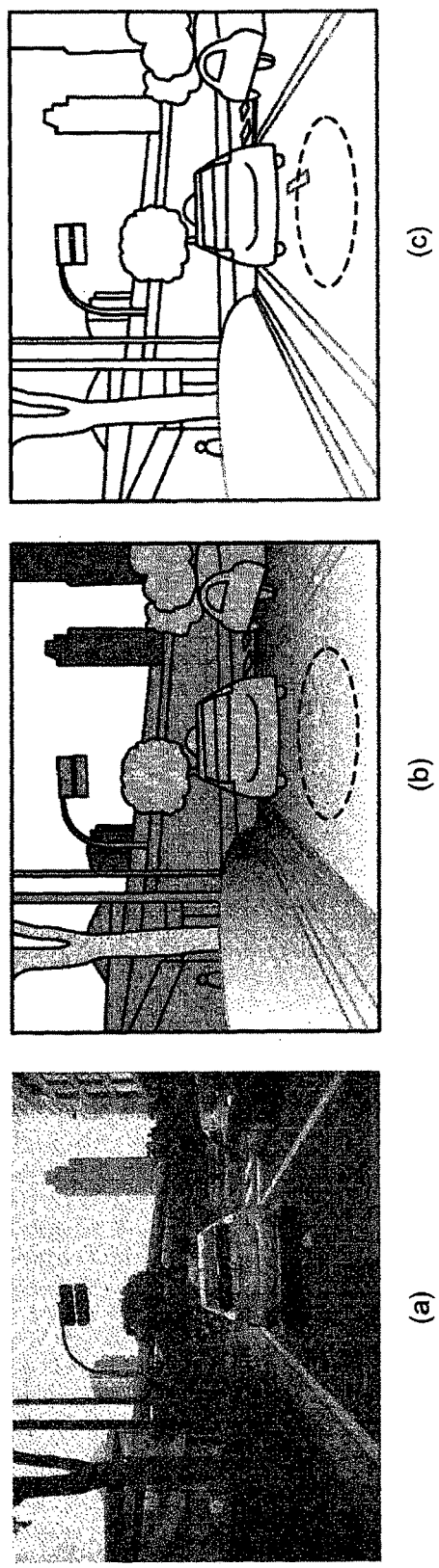
FIG. 2 illustrates (a) an example of a reference image, (b) an example of a high density disparity image, and (c) an example of an edge disparity image.

Referring to FIG. 1, the principle of measuring the distance from a stereo camera to an object will be described, in which disparity of the object is derived as a disparity value by conducting stereo imaging using the stereo camera, and the disparity value is used to measure the distance from the stereo camera to the object. FIG. 1 is an illustration of the principle of deriving the distance from imaging devices to an object. The following description explains processes with respect to each single pixel rather than with respect to each predetermined region including a plurality of pixels, to make the explanation simpler.

When the process is performed not in units of single pixels but in units of predetermined regions each including a plurality of pixels, the predetermined region that includes a reference pixel is denoted as a reference region, and the predetermined region that includes a corresponding pixel is denoted as a corresponding region. The reference region may include a reference pixel alone and the corresponding region may include a corresponding pixel alone.

Disparity Value Calculation

The images captured by an imaging device 10a and an imaging device 10b illustrated in FIG. 1 are denoted as a reference image Ia and a comparison image Ib, respectively. In FIG. 1, the imaging device 10a and the imaging device 10b are installed parallel and at the same height. In FIG. 1, a point S on an object E in a three-dimensional space is captured at one position of the imaging device 10a and also at one position of the imaging device 10b, wherein these two positions are on the same horizontal line of the imaging device 10a and the imaging device 10b. That is, the point S in each image is captured at a point Sa(x,y) in the reference image Ia and a point Sb(x,y) in the comparison image Ib. Here, the disparity value Δ is expressed as Equation (1) using Sa(x,y) in the coordinates of the imaging device 10a and Sb(X,y) in the coordinates of the imaging device 10b.

$$\Delta = X - x \quad (1)$$

Here, as in the case of FIG. 1, the disparity value is written as Δ=Δa+Δb, where Δa is the distance between the point Sa(x,y) in the reference image Ia and the point of intersection of the normal extending from the imaging lens 11a to the imaging surface, and Δb is the distance between the point Sb(X,y) in the comparison image Ib and the point of intersection of the normal extending from the imaging lens 11b to the imaging surface.

Distance Calculation

The distance Z from the imaging devices 10a, 10b to the object E can be derived using the disparity value Δ. Specifically, the distance Z is the distance from the plane including the focus position of the imaging lens 11a and the focus position of the imaging lens 11b to a particular point S on the object E. As illustrated in FIG. 1, the distance Z can be calculated by Equation (2) using the focal length f of the imaging lens 11a and the imaging lens 11b, the base line length B that is the length between the imaging lens 11a and the imaging lens 11b, and the disparity value Δ.

$$Z = (B \times f)/\Delta \quad (2)$$

From Equation (2), the greater the disparity value Δ is, the smaller the distance Z is, and the smaller the disparity value Δ is, the greater the distance Z is.

SGM Method

Referring now to FIG. 2 to FIG. 6, a distance measurement method using the SGM method will be described. FIG. 2(a) is a conceptual diagram illustrating a reference image, FIG. 2(b) is a conceptual diagram illustrating a high density disparity image for FIG. 2(a), and FIG. 2(c) is a conceptual diagram illustrating an edge disparity image for FIG. 2(a). Here, the reference image is an image representing an object by luminance. The high density disparity image is an image that is derived from the reference image by the SGM method and represents the disparity value at each set of coordinates in the reference image. The edge disparity image is an image that is derived by the conventionally used block matching method and represents the disparity values only at a part with relatively strong texture such as an edge in the reference image.

The SGM method is a method of deriving the disparity values appropriately even for an object with weak texture and deriving the high density disparity image illustrated in FIG. 2(b) based on the reference image illustrated in FIG. 2(a). When the block matching method is used, the edge disparity image illustrated in FIG. 2(c) is derived based on the reference image illustrated in FIG. 2(a). As can be understood by comparing the ovals enclosed by the broken lines in FIG. 2(b) and FIG. 2(c), compared with the edge disparity image, the high density disparity image can represent detailed information such as a road with weak texture and therefore enables distance measurement in more detail.

In the SGM method, a disparity value is derived by calculating a cost and thereafter further calculating a synthesized cost that is synthesized dissimilarity, rather than deriving a disparity value immediately after calculating a cost that is dissimilarity. In this method, a disparity image (here, high density disparity image) representing disparity values in almost all the pixels is finally derived.

The block matching method is the same as the SGM method in that a cost is calculated. However, unlike the SGM method, the disparity values only at a part with relatively strong texture such as an edge are derived without synthesized costs being calculated.

Calculation of Cost

Figure 3:
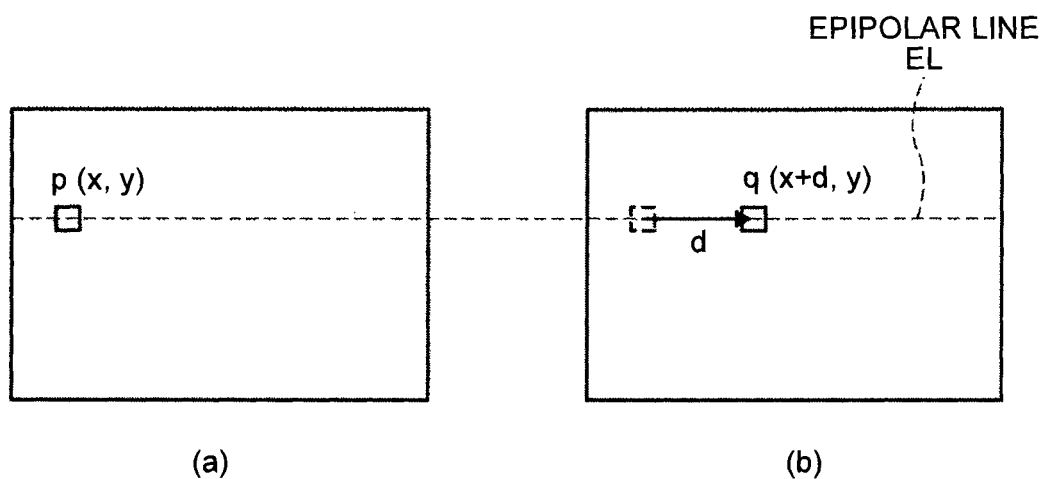
FIG. 3 illustrates a calculation of a shift amount while successively shifting candidates for a corresponding pixel in a comparison image relative to a reference image.
Figure 4:
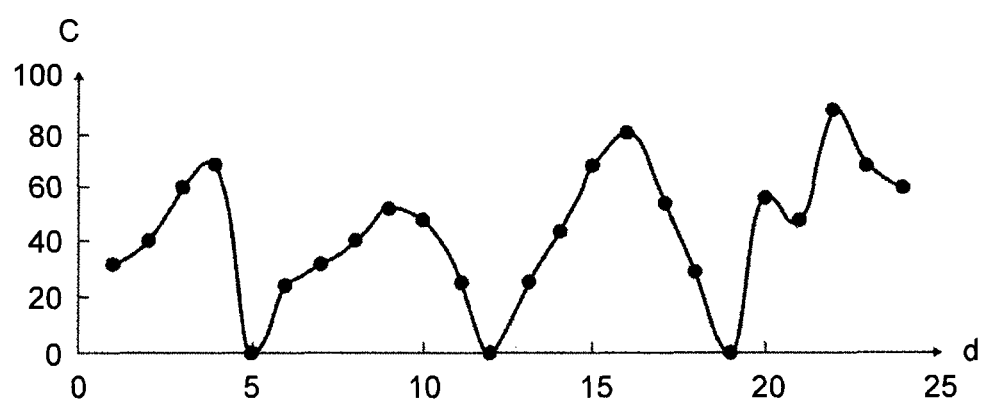
FIG. 4 is a graph illustrating costs with respect to shift amounts.

Referring first to FIG. 3 and FIG. 4, a method of calculating a cost C(p,d) will be described. FIG. 3(a) is a conceptual diagram illustrating a reference pixel in a reference image and FIG. 3(b) is a conceptual diagram of calculating shift amounts (displacement amounts) while successively shifting (displacing) candidates for the corresponding pixel in a comparison image relative to the reference pixel in (a). FIG. 4 is a graph illustrating costs with respect to shift amounts. Here, the corresponding pixel is a pixel in the comparison image that is the most similar to the reference pixel in the reference image. In the following description, it is assumed that C(p,d) represents C(x,y,d).

As illustrated in FIG. 3(a), the cost C(p,d) of each candidate corresponding pixel q(x+d,y) that corresponds to the reference pixel p(x,y) is calculated based on the luminance values of a predetermined reference pixel p(x,y) in the reference image and of a plurality of candidate corresponding pixels q(x+d,y) on the epipolar line in the comparison image that corresponds to the reference pixel p(x,y). The variable d is a shift amount (displacement amount) of each candidate q for the corresponding pixel from the reference pixel p, and a shift amount is expressed in units of pixels in the present embodiments. That is, in FIG. 3, the cost C(p,d) that is dissimilarity in luminance value between a candidate corresponding pixel q(x+d,y) and the reference pixel p(x,y) is calculated while successively shifting the candidate corresponding pixels q(x+d,y) one pixel by one pixel in a predetermined range (for example, 0<d<25). A known method such as SAD (Sum of Absolute Difference) is applied as the method of calculating the cost C where the cost C denotes dissimilarity.

As illustrated in FIG. 4, the cost C(p,d) thus calculated can be expressed by a graph of a cost curve that is a set of the costs C with respect to shift amounts d. In FIG. 4, since the cost C is zero when the shift amount d=5, 12, 19, the minimum value cannot be obtained. In the case of an object with weak texture, it is thus difficult to obtain the minimum value of the cost C.

Calculation of Synthesized Cost

Figure 5:
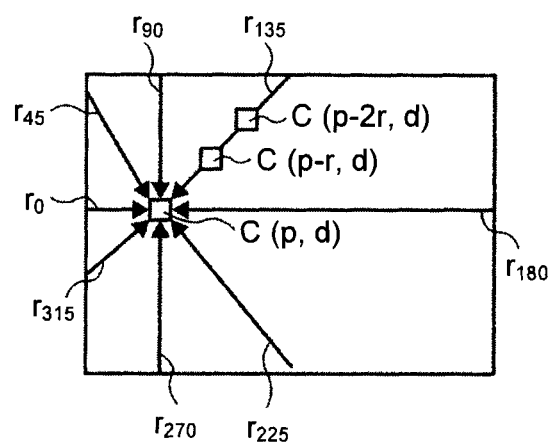
FIG. 5 is a conceptual diagram for deriving a synthesized cost.
Figure 6:
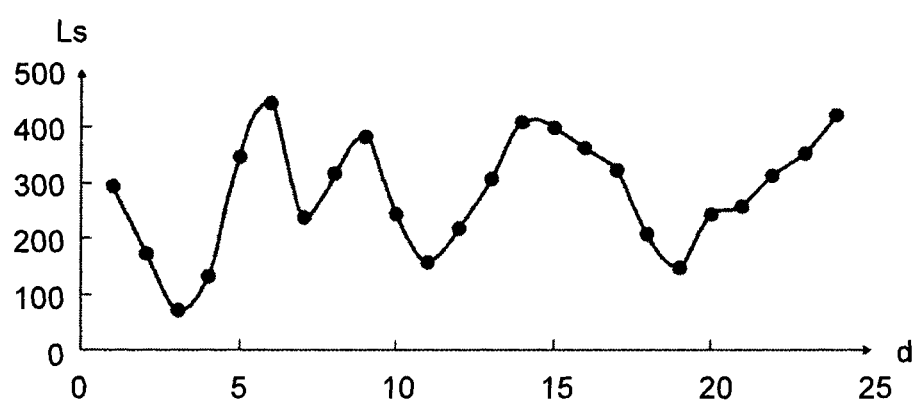
FIG. 6 is a graph illustrating synthesized costs with respect to disparity values.

Referring now to FIG. 5 and FIG. 6, the method of calculating a synthesized cost Ls(p,d) will be described. FIG. 5 is a conceptual diagram for deriving a synthesized cost. FIG. 6 is a graph of a synthesized-cost curve illustrating synthesized costs with respect to disparity values. In the method of calculating a synthesized cost in the present embodiments, the cost C(p,d) in the reference pixel p(x,y) is calculated, and costs for each one of pixels $p(x_n,y_n)$ existing near to far positions from the reference pixel p(x,y) is also calculated as costs C for each one of another reference pixels $p(x_n,y_n)$. With this configuration, the synthesized cost Ls(p, d) for the reference pixel p(x,y) is calculated by aggregating the calculated cost C(p,d) for the reference pixel p(x,y) and the calculated costs C for other reference pixels $p(x_n,y_n)$ existing near to far positions from the reference pixel p(x,y). Similarly, the synthesized cost Ls for each one of reference pixels $p(x_n,y_n)$ is calculated by aggregating the calculated cost C for one reference pixel $p(x_n,y_n)$ and the calculated costs C for other reference pixels existing near to far positions from the reference pixel $p(x_n,y_n)$.

The method of calculating a synthesized cost will now be described in more detail. In order to calculate the synthesized cost Ls(p,d), first, it is necessary to calculate a path cost Lr(p,d). Equation (3) is an equation for calculating the path cost Lr(p,d), and Equation (4) is an equation for calculating the synthesized cost Ls.

$$Lr(p,d)=C(p,d)+\min\{(Lr(p-r,d), Lr(p-r,d-1)+P1, Lr(p-r,d+1)+P1, Lrmin(p-r)+p2\} \quad (3)$$

Here, in Equation (3), r denotes a direction vector in the aggregation direction and has two components of the x direction and the y direction. The term min{} is a function for obtaining the minimum value. Lrmin(p−r) denotes the minimum value of Lr(p−r,d) when the shift amount d is changed in the coordinates in which p is shifted by one pixel in r direction. Lr is recurrently applied as expressed in Equation (3). P1 and P2 are fixed parameters set by experiment in advance such that the disparity values Δ of adjacent reference pixels on the path are likely to be continuous. For example, P1=48, P2=96.

As expressed in Equation (3), Lr(p,d) is obtained by adding the minimum value of the path cost Lr of each pixel in the pixels in r direction illustrated in FIG. 5 to the cost C in the reference pixel p(x,y). As described above, in order to obtain Lr at each pixel in r direction, Lr is obtained first from the endmost pixel in r direction of the reference image p(x,y), and Lr is obtained along r direction.

As illustrated in FIG. 5, $Lr_0$, $Lr_{45}$, $Lr_{90}$, $Lr_{135}$, $Lr_{180}$, $Lr_{225}$, $Lr_{270}$, $Lr_{315}$ in eight directions are obtained, and the synthesized cost Ls is eventually obtained based on Equation (4).

$$Ls(p,d) = \sum_8 Lr \quad (4)$$

The synthesized cost Ls(p,d) thus calculated can be represented by a graph of a synthesized-cost curve representing the synthesized cost Ls(p,d) with respect to the shift amount d, as illustrated in FIG. 6. In FIG. 6, the synthesized cost Ls has the minimum value when the shift amount d=3 and therefore is calculated as the disparity value Δ=3.

Although the number of r is eight in the foregoing description, the number is not limited thereto. For example, the eight directions may be further divided by two into 16 directions or by three into 24 directions.

Although being expressed as "dissimilarity", the cost C may be expressed as "similarity" that is a reciprocal of dissimilarity. In this case, a known method such as NCC (Normalized Cross Correlation) is applied as the method of calculating the cost C. In this case, the disparity value Δ not with the minimum but with the "maximum" synthesized cost Ls is derived. The similarity and the dissimilarity may be inclusively denoted as "matching degree".

Specific Description of Present Embodiments

Specific descriptions of the present embodiments are given below with reference to the drawings. Here, an object recognition system 1 mounted on an automobile will be described.

The object recognition system 1 may be mountable not only on an automobile as an example of a vehicle but also on a motor bicycle, a bicycle, a wheelchair, and an agricultural cultivator as other examples of a vehicle. The object recognition system 1 may be mountable not only on a vehicle as an example of a movable apparatus but also on a robot as another example of a movable apparatus. The robot may not be a movable apparatus but may be an apparatus such as an industrial robot fixedly installed in FA (Factory Automation). The apparatus fixedly installed may not be a robot but may be a security monitoring camera.

Configuration of Embodiment

First, the overall configuration of each of the present embodiments will be described with reference to FIG. 7 to FIG. 9.

External Configuration

Figure 8:
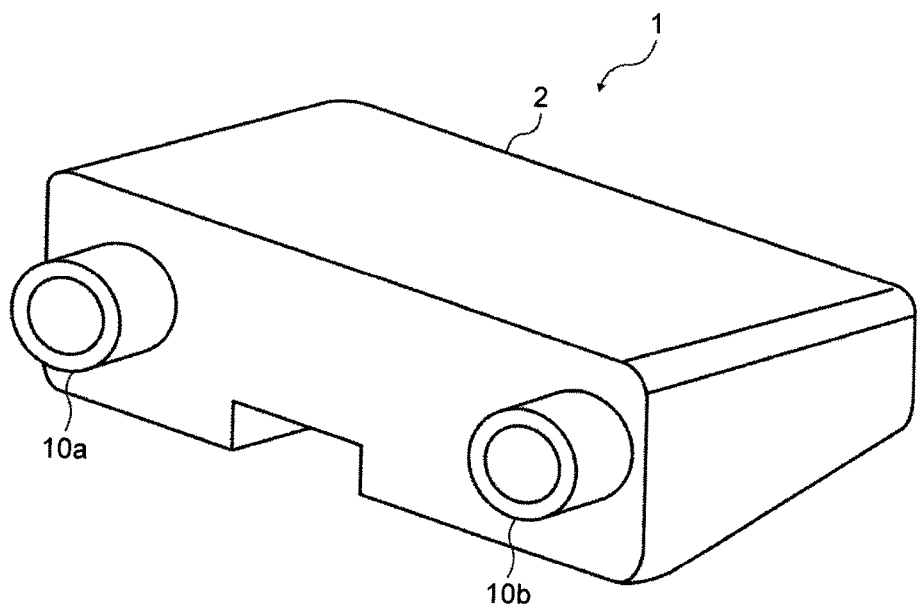
FIG. 8 is a schematic diagram of the disparity value deriving device.

With reference to FIG. 7 and FIG. 8, an external configuration of the object recognition system 1 in the present embodiments will be described. FIG. 7(a) is a schematic diagram depicting a side of an automobile equipped with the object recognition system according to an embodiment of the present invention and FIG. 7(b) is a schematic diagram depicting the front of the automobile. FIG. 8 is a schematic diagram of the object recognition system.

As illustrated in FIGS. 7(a) and 7(b), the object recognition system 1 in the present embodiments includes an imaging device 10a and an imaging device 10b. The imaging device 10a and the imaging device 10b are installed so as to be able to image the scene ahead in the direction in which the automobile travels.

As illustrated in FIG. 8, the object recognition system 1 includes a main body 2 and a pair of cylindrical imaging device 10a and imaging device 10b provided on the main body 2.

Overall Hardware Configuration

Figure 9:
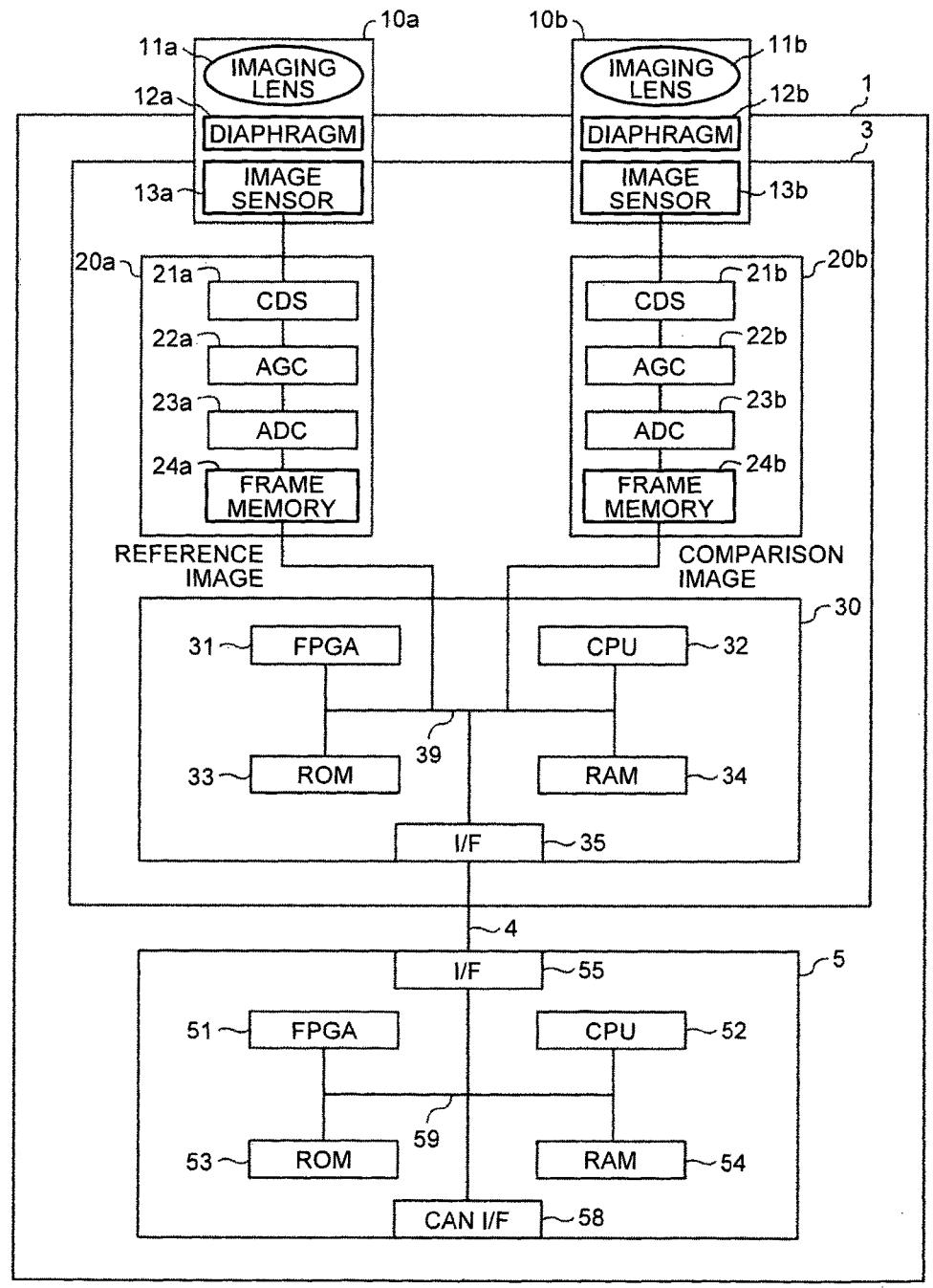
FIG. 9 is a hardware configuration diagram of the disparity value deriving device as a whole.

Referring now to FIG. 9, an overall hardware configuration of the object recognition system 1 will be described. FIG. 9 is a hardware configuration diagram of the object recognition system as a whole.

As illustrated in FIG. 9, the object recognition system 1 includes a disparity value deriving device 3 and an object recognition device 5 in the main body 2. The disparity value deriving device 3 derives a disparity value Δ indicating disparity for an object E from a plurality of images obtained by imaging the object E and outputs a high density disparity image indicating the disparity value Δ in each pixel. The object recognition device 5 performs processing such as measuring the distance from the imaging devices 10a, 10b to the object E, based on the high density disparity image output from the disparity value deriving device 3.

Here, a hardware configuration of the disparity value deriving device 3 will be described first. As illustrated in FIG. 9, the disparity value deriving device 3 includes the imaging device 10a, the imaging device 10b, a signal conversion device 20a, a signal conversion device 20b, and an image processing device 30.

The imaging device 10a generates an analog signal representing an image by imaging the scene ahead and includes an imaging lens 11a, a diaphragm 12a, and an image sensor 13a. The imaging lens 11a is an optical element for diffracting light passing through the imaging lens 11a to form an image of an object. The diaphragm 12a cuts off part of light passing through the imaging lens 11a to adjust the quantity of light input to the image sensor 13a described later. The image sensor 13a is a semiconductor device that converts light input from the imaging lens 11a and the diaphragm 12a into an electrical analog image signal and is implemented, for example, by a charge coupled device (CCD) or a complementary metal oxide semiconductor (CMOS). The imaging device 10b has the same configuration as the imaging device 10a, and a description of the imaging device 10b is omitted. The imaging lens 11a and the imaging lens 11b are installed such that their respective lens surfaces are on the same plane.

The signal conversion device 20a converts an analog signal representing the captured image into image data in digital format, and includes a correlated double sampling (CDS) 21a, an auto gain control (AGC) 22a, an analog digital converter (ADC) 23a, and a frame memory 24a. The CDS 21a removes noise by correlated double sampling from the analog image signal converted by the image sensor 13a. The AGC 22a performs gain control of controlling the intensity of the analog image signal having noise removed by the CDS 21a. The ADC 23a converts the analog image signal gain-controlled by the AGC 22a into image data in digital format. The frame memory 24a stores the image data converted by the ADC 23a.

Similarly, the signal conversion device 20b obtains image data from the analog image signal converted by the imaging device 10b and includes a CDS 21b, an AGC 22b, an ADC 23b, and a frame memory 24b. The CDS 21b, the AGC 22b, the ADC 23b, and the frame memory 24b have the same configuration as the CDS 21a, the AGC 22a, the ADC 23a, and the frame memory 24a, respectively, and a description thereof is omitted.

The image processing device 30 is a device for processing image data converted by the signal conversion device 20a and the signal conversion device 20b. The image processing device 30 includes a field programmable gate array (FPGA) 31, a central processing unit (CPU) 32, a read only memory (ROM) 33, a random access memory (RAM) 34, an interface (I/F) 35, and a bus line 39 such as an address bus and a data bus for electrically connecting the components 31 to 35 as illustrated in FIG. 9.

The FPGA 31 is an integrated circuit and performs the process of calculating a disparity value Δ in the image represented by image data in accordance with an instruction from the CPU 32. The CPU 32 controls each function in the disparity value deriving device 3. The ROM 33 stores an image processing program for the CPU 32 to execute to control each function in the disparity value deriving device 3. The RAM 34 is used as a work area for the CPU 32.

The I/F 35 is an interface for communicating with the I/F 55 of the object recognition device 5 described later through the bus line 4 such as an address bus and a data bus.

A hardware configuration of the object recognition device 5 will now be described. As illustrated in FIG. 9, the object recognition device 5 includes an FPGA 51, a CPU 52, a ROM 53, a RAM 54, an I/F 55, a CAN I/F 58, and a bus line 59 such as an address bus and a data bus for electrically connecting the components 51 to 55, 58 as illustrated in FIG. 9.

The FPGA 51, the CPU 52, the ROM 53, the RAM 54, the I/F 55, and the bus line 59 have the same configuration as the FPGA 31, the CPU 32, the ROM 33, the RAM 34, the I/F 35, and the bus line 39, respectively, in the image processing device 30 and a description thereof is omitted. The I/F 55 is an interface for communicating with the I/F 35 in the image processing device 30 through the bus line 4. The ROM 53 stores an object recognition program for the CPU 52 to execute to control each function in the object recognition device 5.

The CAN I/F 58 is an interface for communicating with, for example, an external controller and can be connected to, for example, a controller area network (CAN) of the automobile.

In such a configuration, when a high density disparity image is transmitted from the I/F 35 of the image processing device 30 to the object recognition device 5 through the bus line 4, the FPGA 51 calculates the distance Z from the imaging devices 10a, 10b to an object E according to an instruction from the CPU 52 in the object recognition device 5. The FPGA 31 may calculate the distance Z under an instruction from the CPU 32 of the image processing device 30, rather than the FPGA 51 calculating the distance Z under an instruction from the CPU 52 in the object recognition device 5.

The programs described above may be recorded in an installable or executable file format on a computer-readable storage medium to be distributed. Examples of the storage medium include a compact disc read only memory (CD-ROM) and a secure digital (SD) memory card.

Specific Description of Embodiments

A specific description of embodiments will be described below with reference to the accompanying drawings.

First Embodiment

First, a first embodiment of the present invention will be described.

Hardware Configuration of Principal Part

Figure 10:
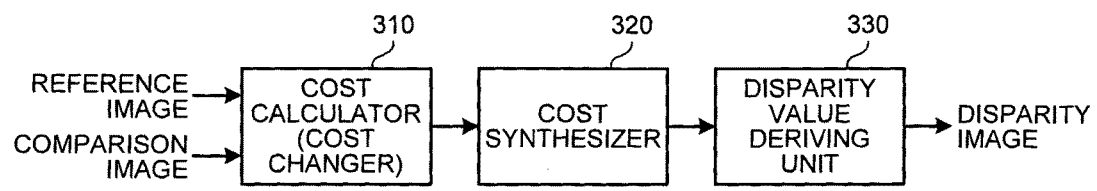
FIG. 10 is a hardware configuration diagram of the principal part of the disparity value deriving device.

Referring to FIG. 3, FIG. 9 and FIG. 10, a hardware configuration of the principal part of the disparity value deriving device 3 according to the first embodiment will be described. FIG. 10 is a hardware configuration diagram of the principal part of the disparity value deriving device according to the first embodiment.

The FPGA 31 in FIG. 9 includes a cost calculator 310, a cost synthesizer 320, and a disparity value deriving unit 330, as illustrated in FIG. 10. Although these are part of the circuit of the FPGA 31, the same processing may be performed through execution of the image processing program.

The cost calculator 310 calculates costs C of candidate corresponding pixels q(x+d,y) that corresponds to the reference pixel p(x,y), based on the luminance value of the reference pixel p(x,y) in the reference image (see FIG. 3(a)) and the luminance values of candidate corresponding pixels q(x+d,y) that are shifted on the epipolar line EL based on the reference pixel p(x,y) in the comparison image (see FIG. 3(b)) and are specified with respect to individual shift amounts d, as illustrated in FIG. 3. The cost calculator 310 also serves as a cost changer and changes a cost exceeding a threshold Th, among the calculated costs C, to a given value H higher than the threshold Th.

The cost synthesizer 320 synthesizes, with respect to each shift amount d, a cost C of a candidate corresponding pixel q(x+d,y) that corresponds to a certain reference pixel p(x,y) after the change by the cost calculator 310 (cost changer) and a cost C of a candidate q'(x'+d,y') for the corresponding pixel that corresponds to another reference pixel p'(x',y') after the change by the cost calculator 310 (cost changer), thereby outputting a synthesized cost Ls. This synthesizing process is a process of eventually calculating a synthesized cost Ls by calculating a path cost Lr from the cost C based on Equation (3) and thereafter further adding the path costs Lr for the respective directions based on Equation (4).

The disparity value deriving unit 330 derives the disparity value Δ based on the position (x,y) in the reference image of a certain reference pixel p(x,y) and the position (x+Δ,y) of the corresponding pixel q(x+Δ,y) in the comparison image, for which the synthesized cost Ls after the synthesis by the cost synthesizer 320 is smallest, and outputs a disparity image indicating the disparity value in each pixel.

Processing or Operation of Embodiment

Referring now to FIG. 9 to FIG. 14, the processing or operation of the present embodiment will be described. In the present embodiment, a case where the synthesized cost Ls is derived from the reference image illustrated in FIG. 12(a) will be described. For easy understanding of the drawing, part of the image in FIG. 12(a) is illustrated in FIG. 12(b).

Figure 11:
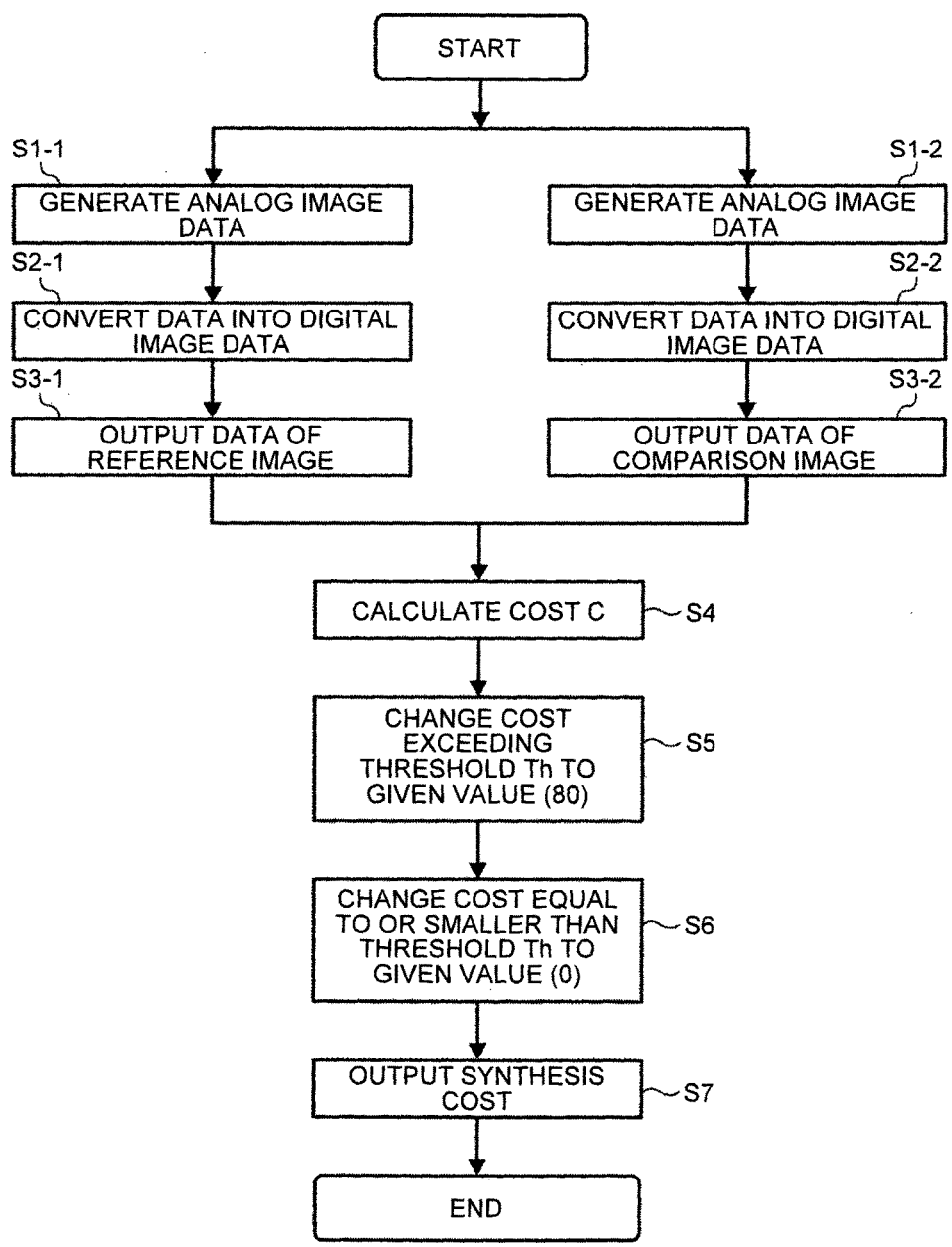
FIG. 11 is a flowchart illustrating the processing in a first embodiment.
Figure 13:
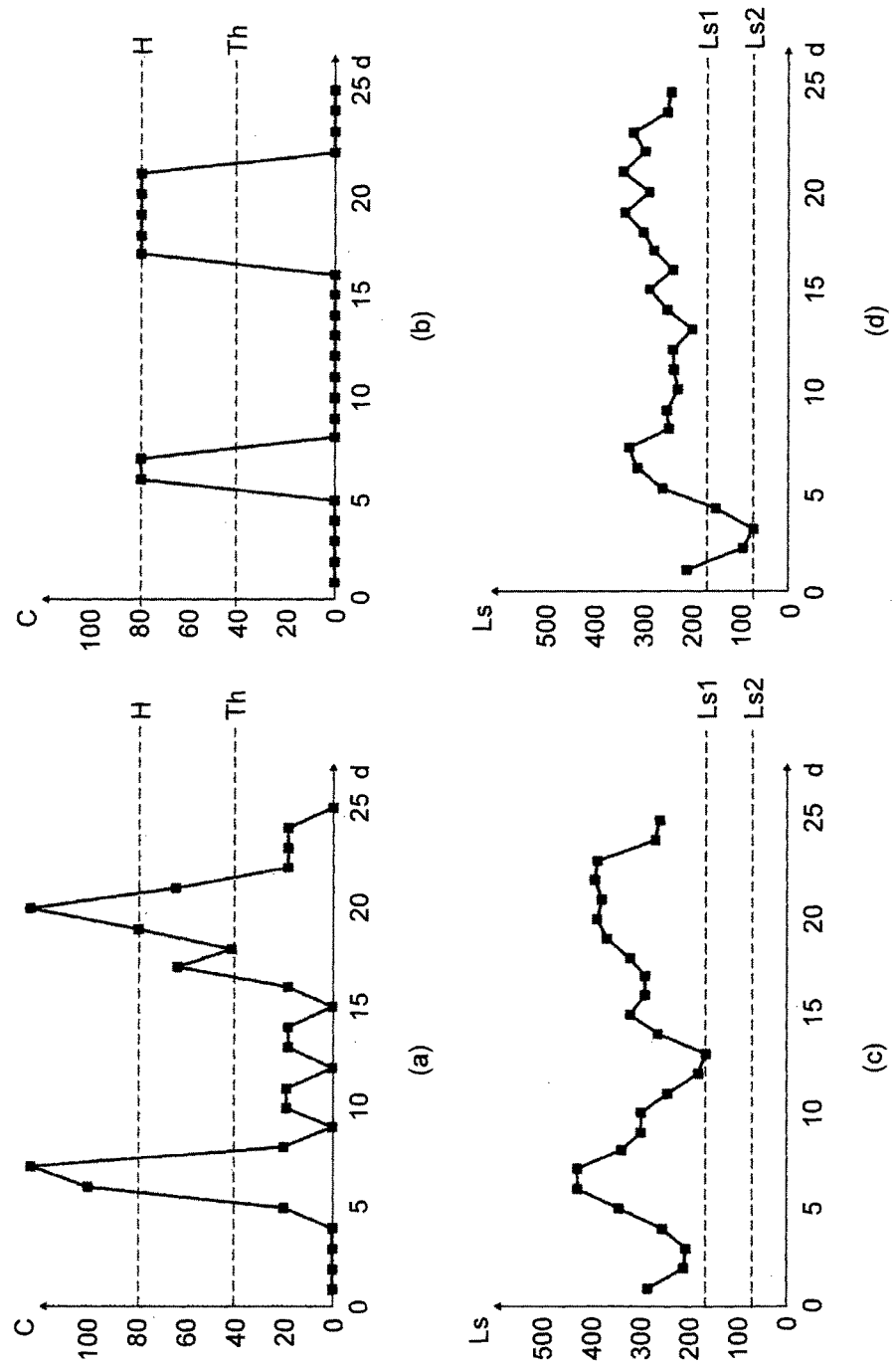
FIG. 13 illustrates a graph of costs without cost change, a graph of costs with cost change, a graph of synthesized costs without cost change, and a graph of synthesized costs with cost change.

FIG. 11 is a flowchart illustrating the processing in the present embodiment. FIG. 12(a) is a conceptual diagram illustrating a reference image, FIG. 12(b) is a conceptual diagram illustrating a part of the reference image, FIG. 12(c) is a conceptual diagram illustrating a high density disparity image for FIG. 12(b) without cost change, FIG. 12(d) is a conceptual diagram illustrating a high density disparity image for FIG. 12(b) with cost change with a threshold Th=40, and FIG. 12(e) is a conceptual diagram illustrating a high density disparity image for FIG. 12(b) with cost change with a threshold Th=20. FIG. 13(a) is a graph illustrating costs without cost change, FIG. 13(b) is a graph illustrating costs with cost change, FIG. 13(c) is a graph illustrating synthesized cost without cost change, and FIG. 13(d) illustrates synthesized cost with cost change. In the graphs in FIGS. 13(a) and 13(b), the vertical axis represents costs C and the horizontal axis represents shift amounts d. In the graphs in FIGS. 13(c) and 13(d), the vertical axis represents synthesized costs Ls and the horizontal axis represents shift amounts d.

First, the imaging device 10a illustrated in FIG. 9 generates analog image data by imaging an object E (step S1-1). Similarly, the imaging device 10a generates analog image data by imaging the object (step S1-2).

The signal conversion device 20a then converts the analog image data into digital image data (step S2-1). Similarly, the signal conversion device 20b converts the analog image data into digital image data (step S2-2).

The signal conversion device 20a then outputs the converted digital image data to the FPGA 31 of the image processing device 30 as data of a reference image (step S3-1). The conceptual diagram of this reference image is illustrated in FIG. 12(a). Similarly, the signal conversion device 20b outputs the converted digital image data to the FPGA 31 of the image processing device 30 as data of a comparison image (step S3-2). This comparison image, which is an image captured by the imaging device 10b, has no significant difference from the reference image illustrated in FIG. 12(a) and therefore a conceptual diagram of the comparison image is omitted without illustration.

The cost calculator 310 illustrated in FIG. 10 then calculates costs C with respect to individual shift amounts d, as illustrated in the graph in FIG. 13(a), based on the data of the reference image and the data of the comparison image (step S4). Here, supposing that the cost calculator 310 does not change the costs as a cost changer, the cost synthesizer 320 generates and outputs a synthesized cost Ls with respect to each shift amount d, as illustrated in the graph in FIG. 13(c). In this case, since the shift amount d=13 gives the smallest synthesized cost Ls (Ls1), the disparity value deriving unit 330 outputs a disparity value Δ=13. The high density disparity image in this case is the image as illustrated in FIG. 12(c).

By contrast, in the present embodiment, the cost calculator 310 changes the costs as a cost changer and changes the cost C exceeding a threshold Th (for example, C=40) to a given value (for example, C=80), as illustrated in the graph in FIG. 13(b) (step S5). The cost calculator 310, as a cost calculator, further changes the cost C equal to or smaller than the threshold Th (for example, C=40) to a given value (for example, C=0), as illustrated in the graph in FIG. 13(b) (step S6). Step S5 and step S6 may be processed in the reverse order or may be processed concurrently.

The cost synthesizer 320 illustrated in FIG. 10 then outputs the synthesized cost Ls with respect to individual shift amounts d, as illustrated in the graph in FIG. 13(d) (step S7). In this case, since the shift amount d=3 gives the smallest synthesized cost Ls (Ls2), the disparity value deriving unit 330 outputs a disparity value Δ=3. The high density disparity image in this case is a silhouette image as illustrated in FIG. 12(d). This silhouette image is a schematic image of an object in the reference image recognized by the object recognition device 5 and decreases in size as the threshold Th is lower. The threshold Th approaching zero has an advantage of increasing the accuracy of the synthesized cost Ls(p,d) but has a disadvantage of increasing the circuit scale of the FPGA 31 for calculating the synthesized cost Ls(p,d).

As described above, the disparity value Δ varies between when the cost calculator 310 does not change the cost and when it changes the cost. The high density disparity image (see FIG. 12(*d*)) in the case where the costs are changed is more faithful to the object than the high density disparity image (see FIG. 12(*c*)) in the case where the costs are not changed.

The CPU 32 then transmits the high density disparity image represented by the disparity values Δ from the I/F 35 illustrated in FIG. 9 to the I/F 55 of the object recognition device 5 through the bus line 4. The FPGA 51 then calculates the distance Z from the imaging devices 10*a*, 10*b* to the object E under an instruction from the CPU 52 in the object recognition device 5.

Figure 14:
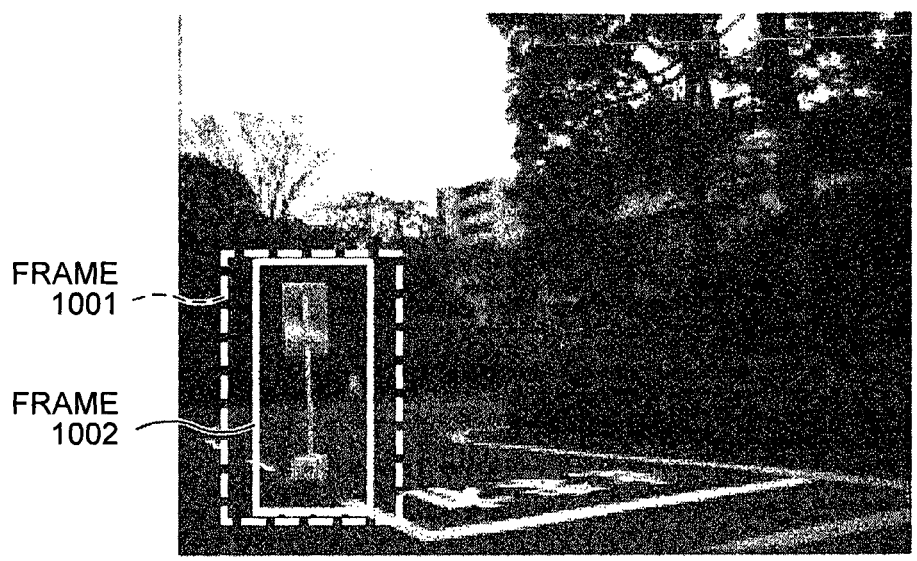
FIG. 14 is a conceptual diagram of a reference image including a frame indicating the size of an object recognition result recognized by an object recognition device.

The object recognition device 5 further recognizes a frame indicating the size of the object E in the reference image as illustrated in FIG. 14. FIG. 14 is a conceptual diagram of the reference image including a frame indicating the size of the object recognition result recognized by the object recognition device. In this case, since the silhouette image is large when the threshold Th=40 as illustrated in FIG. 12(*d*), a frame 1001 (here, denoted by the broken line) is depicted in the reference image in FIG. 14. On the other hand, since the silhouette image is small when the threshold Th=20 as illustrated in FIG. 12(*e*), a frame 1002 (here, denoted by the dashed line) is depicted in the reference image in FIG. 14. The size of the object recognition result may not be indicated by a frame but may be indicated by a longitudinal or oval form, or another form that masks the frame.

Main Advantageous Effects of Embodiment

As described above, in the present embodiment, when the cost C calculated by the cost calculator 310 exceeds the threshold Th, the cost calculator 310 changes the cost C exceeding the threshold Th to a first given value H higher than the threshold Th. As a result, the cost C greater than the first given value H is reduced to the first given value H, so that the cost in an object with weak texture is less susceptible to the costs in the neighboring object with strong texture. This processing therefore achieves the advantageous effect of deriving a more accurate cost.

Changing various costs C to the first given value H also achieves the advantageous effect of reducing the circuit scale of the RAM or other units for deriving a shift amount d.

The cost calculator 310 further changes the cost equal to or smaller than the threshold Th to a second given value, zero, lower than the threshold Th. As described above, the costs C not narrowed down by the first given value H are changed to the second predetermine value zero. Therefore, the shift amount d can be derived through calculation with only two values, namely, the first given value H and the second given value zero, thereby achieving the advantageous effect of further reducing the circuit scale. The calculation with only two values, namely, the first given value H and the second given value zero can reduce the excessive effects brought about by the magnitude of the costs C in calculating the synthesized cost Ls and enables derivation of a disparity value even more faithful to the actual object.

Second Embodiment

A second embodiment of the present invention will now be described. The hardware configuration of the principal part of the present embodiment is the same as the hardware configuration of the principal part of the first embodiment and a description thereof is omitted.

Processing or Operation of Embodiment

Referring now to FIG. 15 to FIG. 18, the processing or operation of the present embodiment will be described. In the present embodiment, a case where the synthesized cost Ls is derived from the reference image illustrated in FIG. 16(*a*) will be described. For easy understanding of the drawing, a part of the image in FIG. 16(*a*) is illustrated in FIG. 16(*b*).

Figure 15:
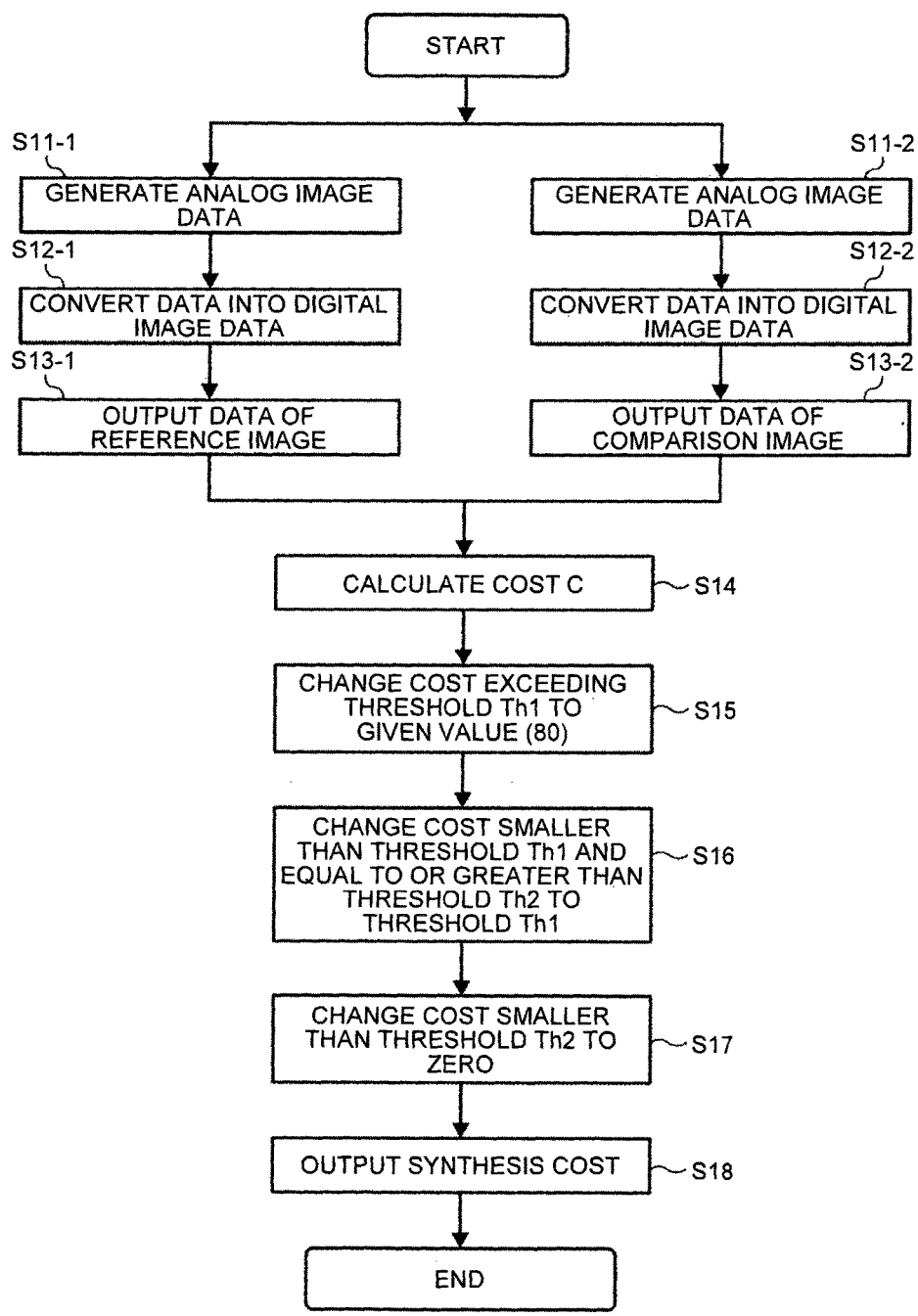
FIG. 15 is a flowchart illustrating the processing in a second embodiment.
Figure 17:
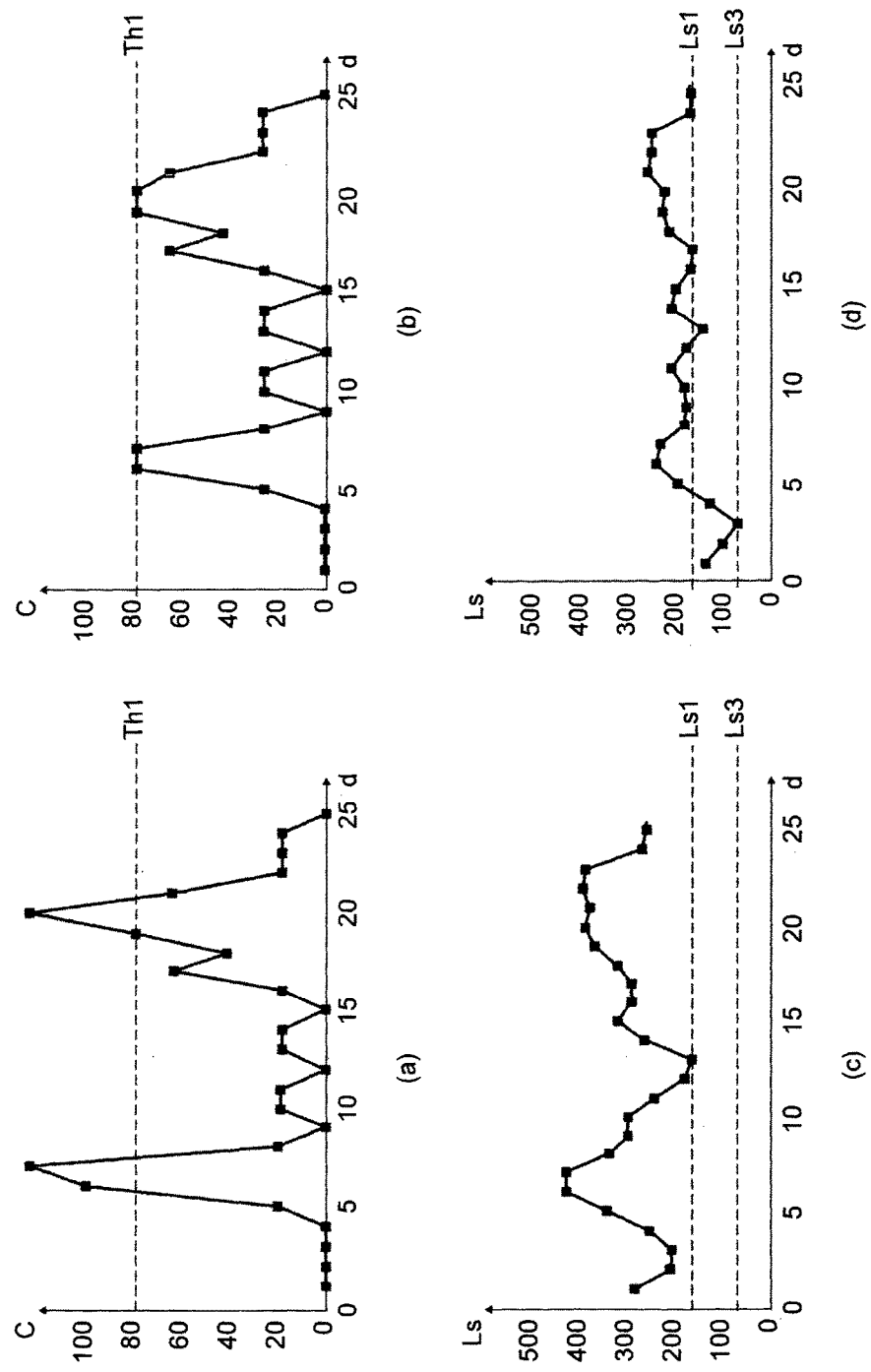
FIG. 17 illustrates a graph of costs without cost change, a graph of costs with cost change, a graph of synthesized costs without cost change, and a graph of synthesized costs with cost change.
Figure 18:
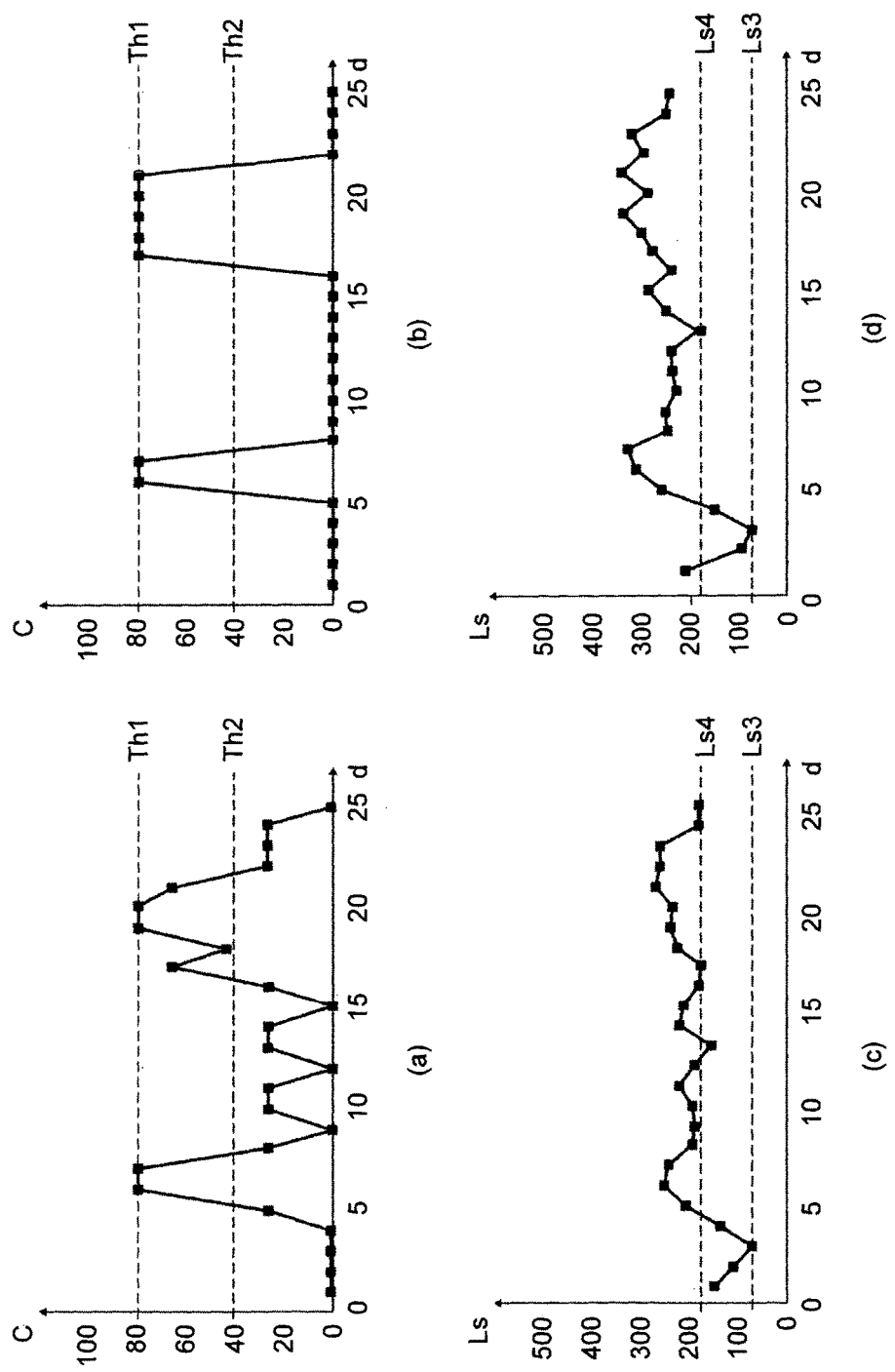
FIG. 18 illustrates a graph identical with (b) of FIG. 17, a graph of costs with cost change, a graph identical with (d) of FIG. 17, and a graph of synthesized costs with cost change.

FIG. 15 is a flowchart illustrating the processing in the second example embodiment. FIG. 16(*a*) is an example of a reference image, FIG. 16(*b*) is a part of the reference image, FIG. 16(*c*) is a conceptual diagram illustrating a high density disparity image for FIG. 16(*b*) without cost change, and FIG. 16(*d*) is a conceptual diagram illustrating a high density disparity image for FIG. 16(*b*) with cost change. FIG. 17(*a*) is a graph illustrating costs without cost change, FIG. 17(*b*) is a graph illustrating costs with cost change, FIG. 17(*c*) is a graph illustrating synthesized costs without cost change, and FIG. 17(*d*) illustrates synthesized costs with cost change. FIGS. 18(*a*) and 18(*c*) are the same graphs as FIGS. 17(*b*) and 17(*d*), respectively. FIGS. 18(*a*) and 18(*c*) are provided to facilitate comparison thereof with FIGS. 18(*b*) and 18(*d*). FIG. 18(*b*) is a graph illustrating costs with further cost change, and FIG. 18(*d*) is a graph illustrating synthesized costs with further cost change.

In the graphs in FIGS. 17(*a*) and 17(*b*) and FIGS. 18(*a*) and 18(*b*), the vertical axis represents costs C and the horizontal axis represents shift amounts d. In the graphs in FIGS. 17(*c*) and 17(*d*) and FIGS. 18(*c*) and 18(*d*), the vertical axis represents synthesized costs Ls and the horizontal axis represents shift amounts d. Steps S11-1 to S14 illustrated in FIG. 15 are the same as steps S1 to S4 illustrated in FIG. 11 and a description thereof is omitted. Step S15 and subsequent steps are described below.

After the processing in step S14, the cost calculator 310 changes the costs as a cost changer and changes the cost C exceeding a threshold Th1 (for example, C=80) to the threshold Th1, as illustrated in the graph in FIG. 17(*b*) (step S15). In this state, the cost synthesizer 320 generates and outputs a synthesized cost Ls with respect to each shift amount d, as expressed by the graph as in FIG. 17(*d*). In this case, since the shift amount d=3 gives the smallest synthesized cost Ls (Ls3), the disparity value deriving unit 330 outputs a disparity value Δ=3. The high density disparity image in this case is the image as illustrated in FIG. 16(*d*).

The cost calculator 310 then changes the costs as a cost changer and changes the cost C smaller than the threshold Th1 and equal to or greater than a threshold Th2 (for example, C=40) to the threshold Th1, as illustrated in the graph in FIG. 18(*b*) (step S16). The cost calculator 310 further changes the costs as a cost changer and changes the cost C smaller than the threshold Th2 to zero, as illustrated in the graph in FIG. 18(*b*) (step S17). In this state, the cost synthesizer 320 generates and outputs a synthesized cost Ls with respect to each shift amount d, as expressed by the graph as in FIG. 18(*d*). In this case, because the shift amount d=3 becomes the smallest synthesized cost Ls (Ls3), the disparity value deriving unit 330 outputs a disparity value Δ=3. In this case, the shift amount d=13 corresponds to a local minimum synthesized cost Ls4, which is a synthesized cost greater than the smallest local minimum synthesized cost (i.e., the smallest synthesized cost Ls3) as illustrated in FIG. 18(*d*). Because the synthesized cost of the local minimum synthesized cost Ls4 of FIG. 18(*d*) is higher compared to FIG. 18(*c*), the lowness of the synthesized cost Ls in the vicinity of the shift amount d=3 of FIG. 18(*d*) becomes prominent. The processing in steps S15 to S17 may be performed in any order or may be processed concurrently.

The cost synthesizer 320 illustrated in FIG. 10 then outputs a synthesized cost Ls with respect to each shift amount d, as illustrated in the graph in FIG. 18(*d*) (step S18). In this case, since the shift amount d=3 gives the smallest synthesized cost Ls (Ls3), the disparity value deriving unit 330 outputs a disparity value Δ=3. The high density disparity image in this case is the image as illustrated in FIG. 16(*e*). The disparity value Δ thus varies between when the cost calculator 310 does not change the costs and when it changes the costs. The high density disparity image (see FIG. 16(*d*)) in the case where the costs are changed is an image more faithful to the object than the high density disparity image (see FIG. 16(*c*)) in the case where the costs are not changed. The high density disparity image (see FIG. 16(*e*)) in the case where the costs C are binarized is an image even more faithful to the object than the high density disparity image (see FIG. 16(*d*)) in the case where the costs C are not binarized.

The CPU 32 thereafter transmits the high density disparity image represented by the disparity value Δ from the I/F 35 illustrated in FIG. 9 to the I/F 55 of the object recognition device 5 through the bus line 4. The FPGA 51 then calculates the distance Z from the imaging devices 10*a*, 10*b* to the object E under an instruction from the CPU 52 in the object recognition device 5.

Since the silhouette image is large when the threshold Th2=40, a frame 1001 is depicted in the reference image as illustrated in FIG. 14, in the same manner as in the first embodiment. On the other hand, since the silhouette image is small when the threshold Th2=20, a frame 1002 is depicted in the reference image as illustrated in FIG. 14.

Main Advantageous Effects of Embodiment

As described above, in the present embodiment, when the cost C calculated by the cost calculator 310 exceeds the threshold Th1 (for example, C=80), the cost calculator 310 (cost changer) changes the cost C exceeding the threshold Th1 to a value equal to or smaller than the threshold Th1. The cost C greater than the threshold Th1 is thus reduced to a value equal to or smaller than the threshold Th1, so that the cost in an object with weak texture is less susceptible to the effects of the cost in the neighboring object with strong texture. This processing therefore achieves the advantageous effect of deriving a more accurate cost.

The cost calculator 310 (cost changer) further changes the cost C smaller than the threshold Th1 and equal to or greater than the threshold Th2 (for example, C=40) to the threshold Th1. The cost calculator 310 (cost changer) changes the cost smaller than the threshold Th2 to a given value smaller than the threshold (for example, C=0). As described above, the costs C are narrowed down as much as possible and eventually controlled by two values (C=0, 80) as illustrated in FIG. 18(*b*). This processing therefore achieves the advantageous effect of reducing the circuit scale of the RAM or the like for deriving the shift amount d.

Supplementary Remarks on Embodiments

In the foregoing embodiments, the cost calculator 310 serves as the cost changer. However, embodiments are not limited thereto and the cost synthesizer 320 may serve as the cost changer. In this case, the cost synthesizer 320 performs cost synthesized after cost change.

In the foregoing second embodiment, the second given value is zero. However, embodiments are not limited thereto and the second given value may be any value such as 10, 20, or 30 as long as it is smaller than the threshold Th.

As described above, to synthesize the costs, if the cost calculated by the calculation unit exceeds a threshold, the cost exceeding the threshold is changed to a given value higher than the threshold. The cost C greater than the given value is thus reduced to the given value, so that the cost in an object with weak texture is less susceptible to the effects of the cost in a neighboring object with strong texture. The present invention therefore achieves the advantageous effect of deriving a more accurate cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A disparity value deriving device comprising:
   circuitry configured to
   obtain a matching degree of a reference region in a reference image captured at a first imaging position with one of regions in a comparison image captured at a second imaging position, the regions in the comparison image being within a certain range and including a region corresponding to the reference region;
   change the matching degree to one of a first value and a second value based on whether the obtained matching degree exceeds a threshold;
   synthesize a changed matching degree having the first value or the second value for one reference region in the reference image and a changed matching degree having the first value or the second value for another reference region near the one reference region in the reference image; and
   derive, based on the synthesized matching degree, a disparity value for an object whose image is captured in the one reference region.

2. The disparity value deriving device according to claim 1, wherein
   in changing the matching degree, the circuitry changes an obtained matching degree exceeding the threshold to the first value, which is higher than the threshold, and
   the circuitry derives the disparity value based on a minimum matching degree of the synthesized matching degree.

3. The disparity value deriving device according to claim 2, wherein
   the circuitry changes an obtained matching degree equal to or smaller than the threshold to the second value, which is lower than the threshold.

4. The disparity value deriving device according to claim 3, wherein the second value is zero.

5. The disparity value deriving device according to claim 1, wherein
   the circuitry changes an obtained matching degree falling below the threshold to the second value, which is lower than the threshold, and
   the circuitry derives the disparity value based on a maximum matching degree of the synthesized matching degree.

6. The disparity value deriving device according to claim 5, wherein
   the circuitry changes an obtained matching degree equal to or greater than the threshold to the first value, which is higher than the threshold.

7. The disparity value deriving device according to claim 1, wherein the circuitry changes an obtained matching degree exceeding the threshold to the second value, which is equal to or smaller than the threshold, and the circuitry derives the disparity value based on a minimum matching degree of the synthesized matching degree.

8. The disparity value deriving device according to claim 1, wherein the circuitry changes an obtained matching degree falling below the threshold to the first value, which is equal to or greater than the threshold, and the circuitry derives the disparity value based on a maximum matching degree of the synthesized matching degree.

9. The disparity value deriving device according to claim 1, wherein the circuitry changes an obtained matching degree exceeding the threshold to the first value, and changes an obtained matching degree falling below the threshold to zero.

10. The disparity value deriving device according to claim 1, wherein the circuitry changes an obtained matching degree exceeding the threshold to one of the first value and the second value, the circuitry derives the disparity value based on a minimum matching degree of the synthesized matching degree, and outputs the disparity value to an object recognition device for recognizing the object in the reference image, and the size of an object recognition result recognized by the object recognition device is based on the threshold.

11. The disparity value deriving device according to claim 1, wherein the circuitry changes an obtained matching degree falling below the threshold to one of the first value and the second value, the circuitry derives the disparity value based on a maximum matching degree of the synthesized matching degree, and outputs the disparity value to an object recognition device for recognizing the object in the reference image, and the size of an object recognition result recognized by the object recognition device is based on the threshold.

12. A movable apparatus comprising the disparity value deriving device according to claim 1.

13. The movable apparatus according to claim 12, wherein the movable apparatus is a vehicle or a robot.

14. A robot comprising the disparity value deriving device according to claim 1.

15. The robot according to claim 14, wherein the robot is an industrial robot fixedly installed.

16. A disparity value producing method comprising:

obtaining a matching degree of a reference region in a reference image captured at a first imaging position with one of regions in a comparison image captured at a second imaging position, the regions in the comparison image being within a certain range and including a region corresponding to the reference region;

changing the matching degree to one of a first value and a second value based on whether the obtained matching degree exceeds a threshold;

synthesizing a changed matching degree having the first value or the second value for one reference region in the reference image and a changed matching degree having the first value or the second value for another reference region near the one reference region in the reference image; and deriving, based on the synthesized matching degree, a disparity value for an object whose image is captured in the one reference region.

17. A non-transitory computer-readable storage medium with an executable program stored thereon and executed by a computer, wherein the program instructs the computer to perform:

obtaining a matching degree of a reference region in a reference image captured at a first imaging position with one of regions in a comparison image captured at a second imaging position, the regions in the comparison image being within a certain range and including a region corresponding to the reference region;

changing the matching degree to one of a first value and a second value based on whether the obtained matching degree exceeds a threshold;

synthesizing a changed matching degree having the first value or the second value for one reference region in the reference image and a changed matching degree having the first value or the second value for another reference region near the one reference region in the reference image; and deriving, based on the synthesized matching degree, a disparity value for an object whose image is captured in the one reference region.

* * * * *